United States Patent [19]

Khinkis et al.

[11] Patent Number: 4,854,249
[45] Date of Patent: Aug. 8, 1989

[54] TWO STAGE COMBUSTION

[75] Inventors: Mark J. Khinkis, Morton Grove; Jitendra G. Patel, Naperville; William A. Sandstrom, Chicago, all of Ill.

[73] Assignee: Institute of Gas Technology, Chicago, Ill.

[21] Appl. No.: 196,363

[22] Filed: May 19, 1988

Related U.S. Application Data

[63] Continuation-in-part of Ser. No. 80,792, Aug. 3, 1987, which is a continuation-in-part of Ser. No. 865,356, May 20, 1986, abandoned.

[51] Int. Cl.$^4$ .......................... F23B 7/00; F23C 11/02
[52] U.S. Cl. .................. 110/342; 48/197 R; 110/346; 110/347; 122/4 D; 431/7
[58] Field of Search ............... 110/342, 346, 347, 245, 110/263; 122/4 D; 431/7; 48/197 R, 206

[56] References Cited

U.S. PATENT DOCUMENTS

| | | |
|---|---|---|
| 2,906,608 | 9/1959 | Jequier et al. . |
| 3,847,563 | 11/1974 | Archer et al. . |
| 3,870,480 | 3/1975 | Moss . |
| 3,949,684 | 4/1976 | Copeland . |
| 3,969,089 | 7/1976 | Moss et al. . |
| 3,970,434 | 7/1976 | Gasior et al. . |
| 4,017,272 | 4/1977 | Anwer et al. . |
| 4,085,707 | 4/1978 | Moss . |
| 4,103,646 | 8/1978 | Yeushalmi et al. ................ 122/4 D |
| 4,111,158 | 9/1978 | Reh et al. ............................ 122/4 D |
| 4,300,914 | 11/1981 | Rice . |
| 4,315,758 | 2/1982 | Patel et al. . |
| 4,442,795 | 4/1984 | Strohmeyer ....................... 122/4 D |
| 4,457,289 | 7/1984 | Korenberg . |
| 4,469,050 | 9/1984 | Korenberg . |
| 4,507,402 | 11/1977 | Rice et al. . |
| 4,579,070 | 4/1986 | Lin et al. ............................. 110/342 |

OTHER PUBLICATIONS

"U-Gas Process", Oil and Gas Journal-Aug. 1, 1977, p. 51 et seq.

Primary Examiner—Peter Kratz
Attorney, Agent, or Firm—Thomas W. Speckman

[57] ABSTRACT

A process for combusting sulfur and nitrogen containing carbonaceous materials in a two stage combustion process wherein sulfur and nitrogen containing carbonaceous materials and sulfur fixation agent particulates are introduced into a first combustion stage single fluidized bed having a density/size selective solids withdrawal conduit. The carbonaceous materials are combusted in the fluidized bed under substoichiometric oxygen conditions at temperatures of about 1600° to about 2000° F. producing ash and reducing gases forming a reducing region in a major portion of the single fluidized bed, the reducing gases comprising gaseous sulfur compounds. In a reducing region of the fluidized bed, the gaseous sulfur compounds are reacted with oxides of the sulfur fixation agent forming an intermediate solid metallic sulfur compound and nitrogen contained in the carbonaceous materials is converted to molecular nitrogen. The intermediate sulfur compound is reacted in an oxidizing region maintained at a base portion of the fluidized bed to form a stable, solid, environmentally acceptable sulfur containing compound which is withdrawn through the selective solids withdrawal conduit with agglomerated ash.

29 Claims, 1 Drawing Sheet

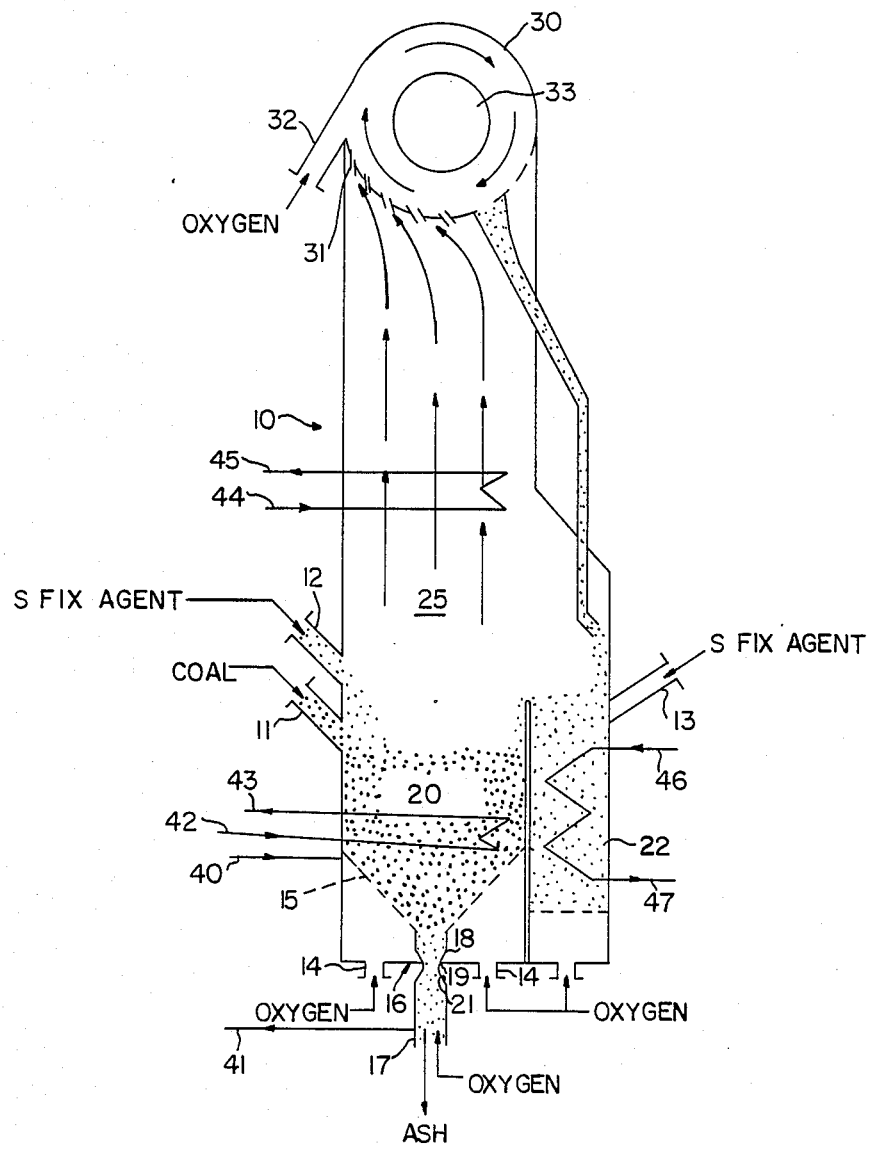

TWO STAGE COMBUSTION

CROSS REFERENCE TO RELATED APPLICATIONS

This application is a continuation-in-part application of copending application Ser. No. 080,792, filed Aug. 3, 1987 as a continuation-in-part application of Ser. No. 865,356, filed May 20, 1986, now abandoned.

BACKGROUND OF THE INVENTION

1. Field of the Invention

The present invention relates to improved two stage combustion of sulfur and nitrogen containing carbonaceous materials, such as coal, low grade fuels and wastes, sludges and liquids. The first stage is carried out in a fluidized bed with density/size selective solids withdrawal and the second stage in a cyclonic combustor. More specifically, this invention relates to reduction of sulfur and nitrogen oxides in combustion flue gases. In situ conversion of harmful and/or unstable sulfur compounds formed during first stage combustion yields an environmentally acceptable sulfur compound within the fluidized bed and at least one selective solids withdrawal conduit. Conversion of fuel-bound nitrogen to molecular nitrogen within the fluidized bed results in low nitrogen oxides in combustion flue gases. The combustion process of this invention may be used in the combustion of a wide variety of carbonaceous materials and in processes for production of thermal energy, such as boilers, for steam production. This invention provides removal of undesired gaseous sulfur compounds formed during combustion by their conversion in the fluidized bed and solids withdrawal conduit to an environmentally acceptable solid form which are safely discharged with agglomerated non-leachable ash.

2. Description of the Prior Art

Carbonaceous materials such as coal may be burned by contacting with oxygen containing gas or may be gasified by contacting with a steam and oxygen containing gas, such as air, at elevated temperatures generally in the range of about 1400° to 3400° F. and at atmospheric and elevated pressures. When using sulfur and nitrogen containing carbonaceous materials, products of the combustion include sulfur and nitrogen oxides and products of the gasification reaction include sulfur compounds such as hydrogen sulfide and carbonyl sulfide which are environmentally undesirable.

The U-Gas Process, as disclosed in Oil and Gas Journal—Aug. 1, 1977, p. 51 et seq., and in U.S. Pat. No. 4,315,758, the teachings of which are incorporated herein by reference, overcomes problems associated with the agglomeration of ash particles within the fluidized bed gasification zone as taught by patents cited therein, but requires the removal of toxic sulfur compounds from the product gas stream. Sulfur compounds present in the carbonaceous feed material are typically converted primarily to gaseous hydrogen sulfide and carbonyl sulfide during gasification in a fluidized bed reactor. These sulfur compounds must be removed from the product gas stream before it is utilized as fuel gas, or for SNG production, ammonia synthesis, and the like to prevent the formation of toxic sulfur oxides or to avoid poisoning synthesis catalysts. One conventional method for removing sulfur compounds from coal gasification product gas requires cooling of the product gas to approximately ambient temperatures and scrubbing it with a chemical or physical absorbent. This method is undesirable since it results in a significant loss in process efficiency, it requires extensive equipment, and it generally produces a considerable amount of waste materials.

U.S. Pat. Nos. 4,457,289 and 4,469,050 teach gasification and combustion in a circulating fluidized bed system with adiabatic or non-adiabatic combustion with an upper cyclonic second stage. More than 50 percent of the total combustion air is fed tangentially to the cyclonic region providing a swirl number greater than 0.6 and a Reynolds number greater than 18,000. The '289 and '050 patents do not teach reduction of $SO_x$ and $NO_x$ in the combustor effluent, nor do they suggest removal of sulfur compounds in an environmentally acceptable solid form.

Circulating fluidized bed combustors are known using inert fluidizing media with addition of limestone to reduce $SO_x$ emission from combustion of high sulfur coal. In such circulating fluidized bed combustor operation the coal ash is elutriated with the gas and exits the top of the vessel, necessitating the utilization of mechanical removal equipment, such as cyclones, baghouses and the like. In using two stage combustion and limiting operating temperatures for $NO_x$ reduction to about 1500° F., the circulating fluidized bed combustor results in large equipment size.

It is known to remove sulfur oxides from flue gases produced by the combustion of coal by contacting the flue gases with alkaline earth metal oxides. Finely divided materials, such as limestone or dolomite may be injected directly into a combustion furnace at a point somewhat removed from the flame, or particulate limestone or dolomite may be used in a fixed, moving or fluidized bed to contact and absorb sulfur oxide gases contained in a flue gas stream. It is also known that combustion of sulfur bearing coal or oil may be conducted in a fluidized bed of limestone which reacts with sulfur oxide gases produced during the combustion. Coal combustion reaction conditions differ significantly from coal or carbonaceous solids gasification reaction conditions, however, since in single stage combustion reactors an excess of oxygen containing gas is required to promote complete combustion, while carbonaceous solids gasification is carried out under reducing conditions. U.S. Pat. No. 3,949,684 teaches total oxidation of sulfur containing coal in a fluidized bed with conversion of sulfur to a metallic sulfate compound. Since oxidizing conditions are present in a single stage combustion reactor, sulfur compounds present are converted to sulfur dioxide gas which reacts with limestone to produce calcium sulfate, a stable solid material which does not require further processing prior to discharge and disposal. However, two stage combustors with sub-stoichiometric combustion in a first combustion zone provide reducing conditions similar to a gasifier.

Introduction of alkaline earth metal oxides, such as calcined limestone or calcined dolomite with the coal feed into a coal gasifier having a flat distributor plate is taught by U.S. Pat. No. 3,969,089 and the patents cited therein to reduce the presence of sulfur compounds in coal gasification product gas. The hydrogen sulfide and carbonyl sulfide gas compounds formed during coal gasification react with the calcium oxide to produce solid calcium sulfide. Calcium sulfide is, however, unstable and decomposes under atmospheric conditions in the presence of water to produce hydrogen sulfide, a poisonous gas. The sulfurized calcined limestone is regenerated in a separate regenerator operated under oxidizing conditions to form sulfur dioxide gas and calcium oxide. This additional process step results in a loss of process efficiency, since it requires a separate reactor and transport of hot solids in water-free condition from one vessel to another and still results in sulfur oxides which are not desired to be released to the atmosphere. U.S. Pat. No. 3,847,563 teaches gasification of coal in a dual fluidized bed wherein desulfurization takes place in a first fluidized bed by addition of calcium oxide to the top of the solids bed from which it is removed as calcium sulfide. U.S. Pat. No. 3,970,434 teaches gasification of coal in admixture with alkaline earth metal oxides for absorption of sulfur and later combustion of the alkaline earth sulfide in a separate unit. U.S. Pat. No. 3,977,844 teaches gasification of coal in the presence of an oxide, hydroxide, bicarbonate or carbonate of an alkali or alkaline earth metal forming a metal sulfide which is transferred to a separator reactor for conversion to gaseous hydrogen sulfide which may be utilized in Claus process technology.

SUMMARY OF THE INVENTION

It is an object of the present invention to provide a process for removal of sulfur compounds released during substoichiometric combustion of carbonaceous materials in a fluidized bed by conversion of harmful and/or unstable sulfur compounds to environmentally acceptable sulfur compound within the fluidized bed and the upper portion of a density/size selective solids withdrawal conduit in a single combustion vessel.

It is another object of the present invention to provide a process having low $NO_x$ formation in two stage combustion by conversion of fuel-bound nitrogen to molecular nitrogen within a first stage fluidized bed while producing stable solid environmentally acceptable compounds within the fluidized bed and the upper portion of a density/size selective solids withdrawal conduit in a single vessel.

It is yet another object of the present invention to provide two stage combustion of carbonaceous materials with low emission of $SO_x$, $NO_x$, CO and total hydrocarbons (THC) having first stage combustion in an agglomerating density/size selective discharge fluidized bed with conversion of gaseous sulfur compounds formed during substoichiometric combustion conditions to solid sulfur compounds in the main body of the fluidized bed, conversion of unstable solid sulfur compounds to stable solid sulfur compounds in the agglomerating density/size selective discharge region of the fluidized bed and discharging them with agglomerated ash and having second stage combustion of reducing gas and elutriated fines in a cyclonic combustor under fuel-lean conditions providing further conversion of the remaining gaseous sulfur compounds to stable solid sulfur compounds, high combustion efficiency and low $SO_x$, $NO_x$, CO and THC emissions.

It is still another object of this invention to provide two stage combustion having fuel-rich combustion in a fluidized bed with density/size selective solids discharge, reaction with limestone for chemical reduction of sulfur compounds produced and conversion of fuel-bound nitrogen to molecular nitrogen in the fluidized bed followed by chemical oxidation of the reduced sulfur compounds and their discharge in a solid state through the density/size selective conduit with evolved gas and elutriated fines passing to a second combustion stage cyclonic combustor for fuel-lean combustion, second stage chemical reaction of remaining sulfur compounds, and solids separation.

The process of the present invention may utilize any suitable ash agglomerating type, or density/size selective solids withdrawal, fluidized bed reactor for first stage combustion, such as the types taught in U.S. Pat. Nos. 3,935,825; 4,229,289; and 4,315,758, the teachings of which are incorporated by reference in their entirety. Carbonaceous feed materials of the type which may be combusted forming an ash residue may be fed to the two stage combustor by any suitable feed system. Within the fluidized bed, the carbonaceous materials are combusted under substoichiometric conditions to produce ash and a gas mixture comprising gaseous sulfur compounds forming a reducing region in a major portion of the single fluidized bed. Combustion is carried out at temperatures depending principally upon the type of carbonaceous feed material and the temperature required to maintain non-slagging conditions for ash, and to provide conversion of fuel-bound nitrogen to molecular nitrogen, generally about 1600° to about 2000° F. The combustor may be operated at about atmospheric to 1450 psi, depending upon the type of carbonaceous feed material. Reducing conditions are maintained throughout a major portion of the fluidized bed due to the production of hydrogen and the low oxygen content of the fluidizing gas. As a result of the reducing conditions, nearly all the sulfur present in the carbonaceous feed material is converted to gaseous hydrogen sulfide and carbonyl sulfide and nearly all of the nitrogen present in the carbonaceous feed material is converted to molecular nitrogen. The ratio of hydrogen sulfide to carbonyl sulfide is typically about 20:1.

Fluidizing gas, comprising an oxygen content up to that of air, up to about 21 volume percent, or higher if oxygen enrichment is used, is introduced into the fluidized bed combustor through a perforated sloping grid gas distributor plate below the fluidized bed. Withdrawal gas, comprising oxygen content up to that of air or having a higher oxygen content up to about 100 volume percent, is introduced into the fluidized bed combustor through at least one solids withdrawal means comprising a venturi classifier system located at low areas of the distributor plate. The withdrawal gas may have a different, generally higher oxygen content than the fluidizing gas. When referring to "oxygen content" or "oxygen containing gas" throughout the description and claims, we mean oxygen available for combustion. The total oxygen fed through both the fluidizing gas and the withdrawal gas is a substoichiometric amount for combustion of the carbonaceous material, and preferably about 40 to about 70 percent of the stoichiometric oxygen for complete combustion. The superficial velocity in the fluidized bed is about 4 to about 15 feet per second. The ratio of oxygen in the two gas introduction conduits is carefully monitored and controlled to maintain the above described oxygen content relationships. A higher temperature is maintained in the solids withdrawal locations at the low areas of the bed to promote agglomeration of high ash concentration particles which are removed by gravity through the venturi classifier and discharged from the bed. This type of ash agglomerating fluidized bed combustor achieves a low level of carbon loss in the non-leachable discharge ash and provides high overall combustion efficiency.

Fines passed upwardly with the reducing gases from the headspace of the fluidized bed first stage combustor are passed to a second stage cyclonic combustor for combustion at about 1800° to about 2200° F. for second stage sulfur removal and providing a suitable gas-solids separation with the fines returned to the fluidized bed first stage combustor. The velocity in the cyclonic combustor is about 30 to about 275 feet per second.

According to the process of the present invention, a sulfur fixation agent is introduced into the fluidized bed combustor along with carbonaceous feed materials to provide removal of sulfur compounds formed from the carbonaceous feed during combustion and fixation of sulfur in a solid state which is environmentally acceptable and which may be safely disposed. Sulfur fixation agents suitable for use in the process of the present invention include metallic carbonate compounds, metal oxide compounds, and combinations thereof, such as limestone and dolomite. Crushed limestone is a preferred sulfur fixation agent, since it is readily available, abundant and relatively inexpensive. Sulfur fixation agent, such as crushed limestone, may be stored in a separate feed supply, mixed with carbonaceous feed solids in a common feed conduit, and injected into the fluidized bed combustor. The amount of sulfur fixation agent introduced into the combustor with the carbonaceous feed material is determined by the amount of sulfur present in the carbonaceous feed. Molar ratios of metal, such as calcium, in the sulfur fixation agent to sulfur in the carbonaceous feed are suitably about 1 to about 5, and preferably about 1.5 to about 3. The desired particle size of the sulfur fixation agent is selected so that the sulfur fixation agent particles have approximately the same retention time in the fluidized bed first stage combustor as the carbonaceous feed, and so that the sulfur compound solid particles are discharged with the ash agglomerates through the venturi classifier at the base of the fluidized bed.

Using crushed limestone as the sulfur fixation agent, the limestone ($CaCO_3$) decomposes to solid calcium oxide and gaseous carbon dioxide shortly after introduction into the combustor due to the high temperatures in the fluidized bed. The solid calcium oxide then reacts with the sulfur compounds formed from the carbonaceous feed materials, gaseous hydrogen sulfide and carbonyl sulfide, according to the following reactions:

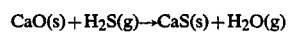

$$CaO(s) + H_2S(g) \rightarrow CaS(s) + H_2O(g)$$

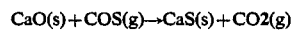

$$CaO(s) + COS(g) \rightarrow CaS(s) + CO_2(g)$$

The gaseous sulfur compounds formed from the carbonaceous feed materials are thus converted to solid calcium sulfide due to the reducing conditions prevailing in the major portion of the fluidized bed. Substantially complete thermodynamic conversion of hydrogen sulfide and carbonyl sulfide to calcium sulfide is achieved in the fluidized bed gasifier since the gaseous products of coal combustion are intimately mixed with excess limestone in the fluidized bed.

The conversion of hydrogen sulfide and carbonyl sulfide to calcium sulfide is limited by the partial pressure of water vapor within the fluidized bed combustor, and it is therefore desirable to reduce the partial pressure of water vapor in the combustion product gas to achieve substantially complete conversion to calcium sulfide of sulfur compounds formed during combustion. In addition, the desired equilibrium of conversion of gaseous sulfur compounds is favored by lower temperatures and higher hydrogen sulfide concentrations. The efficiency of conversion of gaseous sulfur compounds to calcium sulfide is therefore higher for carbonaceous feed materials having a high sulfur content and requiring lower operating temperatures.

As calcium sulfide solids move through the fluidized bed downwardly toward the base of the bed and the density/size selective as agglomerating discharge, they encounter an oxidizing atmosphere at the base of the bed and in the density/size selective withdrawal conduit which results from relatively high levels of oxygen introduced through the venturi classifier withdrawal conduit to promote ash agglomeration. As the calcium sulfide moves through this hot, oxidizing zone at the base of the fluidized bed and in the upper portion of the density/size withdrawal conduit, calcium sulfide is fixed by reaction with oxygen to produce calcium sulfate according to the reaction:

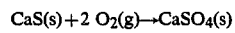

$$CaS(s) + 2\, O_2(g) \rightarrow CaSO_4(s)$$

The temperature, retention time and oxidizing atmosphere is such at the base of the fluidizing bed and in the upper portion of the density/size selective venturi solids withdrawal conduit that substantially all calcium sulfide is converted to calcium sulfate may be discarded along with the ash agglomerates and unreacted limestone since the sulfur has been fixed and exists in a form which does not pose any threat to the environment. Additionally, the limestone fines elutriated from the fluidized bed are fed to the oxygen-rich second stage cyclonic combustor and react with $SO_x$ under the oxidizing conditions to provide removal of $SO_x$ from the furnace effluent. Likewise, elutriated calcium sulfide, is converted to calcium sulfate under the oxidizing conditions of the second stage cyclonic combustor for environmentally acceptable disposal. This invention provides conversion of sulfur released from sulfur containing carbonaceous combustible materials to an environmentally acceptable form for discharge in both stages of two stage combustion having fuel-rich first stage combustion while having a low $NO_x$ formation. The combustion conditions are maintained in the two stage combustion of this invention to result in environmentally acceptable discharge equivalent to less than 20 percent and preferably less than 10 percent of the sulfur in the feed carbonaceous material. By "environmentally acceptable" as used in this description and claims, we mean less than 50 ppm CO, less than 50 ppm THC, less than 100 ppm $NO_x$, and less than 300 ppm $SO_x$ in the flue gas emitted.

BRIEF DESCRIPTION OF THE DRAWING

The above mentioned and other features of the present invention, and the manner of obtaining them, will become apparent and the invention will be best understood by reference to the following description of preferred embodiments read in conjunction with the accompanying drawing, which schematically shows a two stage combustion apparatus suitable for use in one embodiment of the process of the present invention.

DESCRIPTION OF PREFERRED EMBODIMENTS

As shown in the figure, two stage combustor 10 comprises first stage single fluidized bed 20 combustion zone which may be operated under substoichiometric oxygen conditions at temperatures of about 1600° to about 2000° and second stage cyclonic combustion zone 30 which may be operated under excess stoichiometric oxygen conditions at temperatures of about 1800° to about 2200° F.

Carbonaceous feed materials suitable for use in the combustion process of the present invention may comprise any sulfur containing carbonaceous material susceptible to combustion in a fluidized bed of the density/size selective solids discharge type including different types and grades of coal, oil shale, petroleum coke, peat, lignite, solid waste, municipal solid waste, refuse derived fuel, refinery and sewage plant sludges, liquid wastes, waste waters, and solid biomass materials. Coal is an especially preferred carbonaceous feed material, and will be referred to in the following detailed description of preferred embodiments without limiting the process of the present invention with respect to suitable carbonaceous feed materials. Crushed coal is conveyed through solids feed line 11 from supply storage into the fluidized bed region of combustor 10 and may be distributed by any suitable means. Prior pretreatment and/or devolatilization of coal solids is not necessary. Feed solids are generally crushed to achieve particle sizes of average diameters less than about ¼ inch. Liquids may be fed by any means known to the art.

Sulfur fixation agent may be pre-mixed with the coal or preferably conveyed from supply storage through feed line 12 into fluidized bed region of combustor 10 and may be distributed by any suitable means. Sulfur fixation agent may also be fed to the fluidized bed separately from the coal by feed line 13 into solids thermal exchange bed 22. Suitable sulfur fixation agents include limestone, dolomite and other metallic carbonate compounds such as siderite, metal oxide compounds such as oxides of iron and zinc, and mixtures thereof. Limestone is an especially preferred sulfur fixation agent, and will be referred to exclusively hereafter as the sulfur fixation agent, without limiting the process of the present invention with respect to suitable sulfur fixation agents. Limestone is crushed to achieve particle sizes such that the limestone particles have approximately the same retention time in the fluidized bed reactor as the coal particles, and the size and density of limestone particles is such that limestone is discharged along with ash agglomerates through the density/size solids classifier discharge in the lower region of fluidized bed 20. Limestone is generally crushed to obtain particle sizes of average diameters of less than about 1/16 inch. The amount of limestone introduced into fluidized bed 20 is determined by the amount of sulfur present in the coal solids. Limestone is added in an amount to achieve molar ratios of calcium to sulfur of preferably about 1:1 to about 5:1 and most preferably about 1.5:1 to about 3:1.

Fluidized bed 20 is in a lower section within two stage combustor 10 wherein coal and limestone particles are fluidized by a fluidizing gas comprising oxygen containing gas. Fluidizing gas is introduced below fluidized bed 20 through fluidization gas inlets 14 and is distributed to fluidized bed 20 through perforated sloping grid 15 which may be of water cooled design. The amount of the fluidizing gas is controlled to provide reducing conditions throughout the major portion of the body of the fluidized bed. The oxygen concentration in the fluidizing gas may be up to about 100 volume percent, preferably about 20 to about 30 volume percent. The oxygen content of the fluidizing gas may be equal to or may be substantially more than about 5 volume percent and preferably more than about 7 volume percent, less than the oxygen content of the withdrawal gas. An inert diluent gas may be used or flue gas recycled to reduce the available oxygen content of the fluidizing gas. The total oxygen introduced to the fluidized bed by both the fluidizing gas and withdrawal gas is less than the stoichiometric amount required for combustion in the fluidized bed, preferably about 40 to about 70 percent of the oxygen required for complete combustion in the fluidized bed. As sulfur containing carbonaceous solids are combusted in fluidized bed 20, sulfur compounds are released from the carbonaceous solids principally in the form of gaseous hydrogen sulfide and carbonyl sulfide. The calcium carbonate in the limestone particles react with the gaseous hydrogen sulfide and carbonyl sulfide under the chemically reducing conditions of fluidized bed 20 to form solid calcium oxide and gaseous carbon dioxide. The solid calcium oxide circulates in fluidized bed 20 and reacts with substantially all gaseous hydrogen sulfide and carbonyl sulfide to yield solid calcium sulfide, water and carbon dioxide due to the reducing conditions within the major portion of the body of fluidized bed 20. The velocity of the withdrawal gas introduced is adjusted to provide solids residence time in the fluidized bed sufficient to utilize the substoichiometric amount of oxygen for combustion in fluidized bed 20. Solid limestone particles with fixed calcium sulfide and solid carbonaceous material ash particles, after a suitable residence time in fluidized bed 20, migrate to the base of fluidized bed 20 and to the upper portion of selective withdrawal conduit where they are subjected to a chemically oxidizing atmosphere where essentially all of the calcium sulfide is converted to calcium sulfate and ultimately discharged through solids density/size classifier 16 and solids withdrawal conduit 17.

Solids density/size classifier 16 comprises an upwardly extending expanding conical section 18, a constricted central section 19 and a downwardly expanding conical section 21, and entry to upwardly expanding section 18 is positioned in a lower portion of sloping grid 15. A solids withdrawal gas comprising an oxygen containing gas is introduced through withdrawal conduit 17 below solids density/size classifier 16. The solids withdrawal gas comprises oxygen concentration in the range of about 20 to about 100 volume percent oxygen, preferably about 20 to about 30 volume percent oxygen to provide an oxidizing atmosphere within solids density/size classifier 16 and in the lower base portion of fluidized bed 20. The oxygen content of the withdrawal gas may be equal to or may be substantially more than about 5 volume percent and preferably more than about 7 volume percent, greater than the oxygen content of the fluidizing gas. In this way, a chemically oxidizing and hotter region is maintained in the lower zone of the base of fluidized bed 20 to promote agglomeration of ash particles formed by combustion of the carbonaceous feed at near the incipient softening temperature of the ash particles. The ash particles agglomerate until their mass can no longer be supported by the upflowing withdrawal gas passing through density/size solids withdrawal classifier 16, and the ash agglomerates are then discharged by gravity through withdrawal classifier 16 and withdrawal conduit 17. The high temperature zone at the base portion of fluidized bed and in upward extending conical section 18 of selective withdrawal conduit 16 wherein oxidizing conditions prevail promotes the reaction of calcium sulfide with molecular oxygen to produce calcium sulfate. Oxidizing conditions are such in upwardly extending conical section 18 and in the base of fluidized bed that substantially all calcium sulfide is converted to calcium sulfate fixed in the limestone particles which are of suitable density/size to be discharged through selective solids discharge 16 along with the ash agglomerates and unreacted limestone particles. Residence times of particles within the lower oxidizing region of fluidized bed 20 and in upward extending conical section 18 are preferably about 3 to 20 minutes, and most preferably about 5 to 10 minutes. Reducing conditions, residence time and temperature are such in first stage fluidized bed 20 combustion zone that substantially all coal-bound nitrogen is converted to molecular nitrogen. Combustion products from carbonaceous material partial combustion in the first stage fluidized bed 20 combustion zone comprising reducing gases and fines of uncombusted carbonaceous solids and fines of sulfur fixation agent solids are passed upwardly through headspace 25 and introduced tangentially into second stage cyclonic combustor 30 combustion zone.

Second stage cyclonic combustor 30 may be of a design such that the combustion products are introduced through tangential nozzles 31 with additional oxygen-containing gas also being introduced tangentially through conduit 32. The second stage oxygen-containing gas may be air or may be oxygen enriched up to pure oxygen in an amount sufficient to provide excess oxygen for combustion of the reducing gases and uncombusted carbonaceous solids in the second stage combustion zone. It is preferred that the excess oxygen be present in about 5 to about 10 percent excess and that the gases introduced to second stage cyclonic combustor 30 create velocities of about 30 to about 275 feet per second causing intensive contact turbulence enhancing second stage combustion at about 1800° to about 2200° F. The intensive solids/gas contact in second stage cyclonic combustor 30 further enhances calcium reaction with the $SO_x$ gas components and provides separation of the fines. The fines separated in second stage cyclonic combustor 30 are cooled only by contact with membrane wall boiler surfaces and are returned by gravity to the first combustion stage fluidized bed 20. Numerous fines recirculation passes occur before the ash particulate fines and spent limestone fines are small enough to escape the second stage cyclonic combustor and be passed for additional heat recovery before discharge. Flue gases are removed from the central portion of second stage cyclonic combustor 30 through flue exhaust tube 33 providing low $SO_x$, $NO_x$, CO, THC and particulates which are suitable after additional particulate removal for environmentally acceptable emission to the atmosphere.

Thermal energy may be withdrawn from the combustor disclosed in several thermal exchange means and combinations thereof. All of the two stage combustor 10 exterior surfaces may be constructed in the form of a water jacket as in conventional membrane wall boilers. Sloping grid 15 and the upper portion of withdrawal conduit 17 may provide thermal transfer by passage of a fluid, such as water, through the support grid and a jacket of the upper portion of withdrawal conduit 17 shown schematically as bed support heat exchanger inlet 40 and bed support heat exchanger outlet 41. Heat exchange surfaces may be provided within the fluidized bed as shown by fluidized bed heat exchanger inlet 42 and fluidized bed heat exchanger outlet 43. Headspace heat exchangers may be placed in the pathway between the top of fluidized bed 20 and the introduction into cyclonic combustor 30 in headspace 25 as shown schematically in the drawing by headspace heat exchanger inlet 44 and headspace heat exchanger outlet 45. It may also be desirable to cool the fines being returned from cyclonic combustor 30 to fluidized bed 20 via an overflow fluidized bed 22 having a fines bed heat exchanger shown with fines bed heat exchanger inlet 46 and fines bed heat exchanger outlet 47. The heat exchangers may be in a wide variety of configurations known to the art both for the purposes of cooling the first stage combustion zone and headspace and for the purpose of highly efficient production of steam when the combustor is used as a steam generator.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for combusting sulfur and nitrogen containing carbonaceous materials in a two stage combustion process comprising:

introducing sulfur and nitrogen containing carbonaceous materials and sulfur fixation agent particulates selected from the group consisting of metallic carbonates, metallic oxides, and mixtures thereof into a first combustion stage single fluidized bed supported upon and maintained fluidized by fluidizing gas introduced through a perforated sloping bed support grid within a single combustor having a density/size selective solids withdrawal conduit at a base portion of said bed with upflowing withdrawal gas;

combusting said carbonaceous materials in said fluidized bed under substoichiometric oxygen conditions at temperatures of about 1600° to 2000° F. producing ash and reducing gases forming a reducing region in a major portion of said single fluidized bed,.said reducing gases comprising gaseous sulfur compounds;

reacting said gaseous sulfur compounds with oxides of said sulfur fixation agent in said reducing region of said single fluidized bed to form an intermediate solid metallic sulfur compound;

converting said nitrogen contained in said carbonaceous materials into molecular nitrogen in said reducing region of said single fluidized bed;

reacting said intermediate solid metallic sulfur compound in an oxidizing region maintained at a base portion of said fluidized bed and the upper portion of said selective solids withdrawal conduit by said upflowing withdrawal gas to form a stable, solid, environmentally acceptable sulfur-containing compound;

agglomerating said ash in said oxidizing region to form easy transportable, non-leachable, environmentally acceptable ash;

withdrawing said agglomerated ash and said stable, solid, environmentally acceptable sulfur-containing compound from said single fluidized bed through said selective solids withdrawal conduit;

passing said reducing gases, fine particulates of uncombusted said carbonaceous materials and fine particulates of said sulfur fixation agent from said fluidized bed and tangentially introducing said reducing gases and said particulates into a second combustion stage cyclonic combustor;

burning said reducing gases and said uncombusted carbonaceous materials in said second stage cyclonic combustor under excess stoichiometric oxygen conditions at temperatures of about 1800° to 2200° F.;

reacting said fine particulates of said sulfur fixation agent with sulfur oxides formed during said burning in said second stage cyclonic combustor to form a stable, solid, environmentally acceptable sulfur-containing compound;

separating solid fines in said second combustion stage cyclonic combustor and recycling said fines to said first combustion stage fluidized bed; and removing from said second stage combustor flue gases comprising environmentally acceptable amount of CO, $NO_x$, $SO_x$, and THC content.

2. A process according to claim 1 wherein the total amount of said oxygen of said fluidizing gas and said withdrawal gas is about 40 to about 70 percent of the stoichiometric oxygen necessary for complete combustion of said carbonaceous materials in said fludized bed.

3. A process according to claim 2 wherein the superficial velocity in said fluidized bed is about 4 to about 15 feet per second.

4. A process according to claim 3 wherein the velocity in said second stage cyclonic combustor is about 30 to about 275 feet per second.

5. A process according to claim 4 wherein said excess stoichiometric oxygen conditions in said second stage cyclonic combustor are achieved by tangentially introducing oxygen containing gas to provide said oxygen in an amount about 5 to about 10 percent excess of the stoichiometric oxygen necessary for complete combustion in said cyclonic combustor.

6. A process according to claim 5 wherein molar ratios of metal in said sulfur fixation agent to said sulfur in said carbonaceous materials is about 1 to about 5.

7. A process according to claim 6 wherein said sulfur fixation agent particulates are sized to have about the same retention time in said fluidized bed as solids of said carbonaceous materials.

8. A process according to claim 6 wherein said carbonaceous materials are selected from the group consisting of coal, oil shale, petroleum coke, peat, lignite, solid waste, refuse derived fuel, refiner and sewage plant sludges, liquid wastes, solid biomass materials, and mixtures thereof.

9. A process according to claim 6 wherein said sulfur fixation agent is selected from the group consisting of limestone, dolomite, siderite, iron oxide, zinc oxide, and mixtures 10. A process according to claim 6 wherein oxygen content of said withdrawal gas is more than about 5 volume percent greater than oxygen content of said fluidizing gas.

11. A process according to claim 6 wherein thermal energy is withdrawn from said combustor by passage of a fluid through said bed support grid.

12. A process according to claim 11 wherein thermal energy is withdrawn from said combustor by passage of a fluid through a jacket of the upper portion of said withdrawal conduit.

13. A process according to claim 6 wherein thermal energy is withdrawn from said combustor by passage of a fluid through at least one heat exchanger within said fluidized bed.

14. A process according to claim 6 wherein thermal energy is withdrawn from said combustor by passage of a fluid through at least one heat exchanger in the headspace above said fluidized bed.

15. A process according to claim 6 wherein thermal energy is withdrawn from said combustor by passage of a fluid through a jacket surrounding said combustor.

16. A process according to claim 6 wherein thermal energy is withdrawn from said solid fines during recycle from said second combustion stage cyclonic combustor to said first combustion stage fluidized bed.

17. A process according to claim 1 wherein the superficial velocity in said fluidized bed is about 4 to about 15 feet per second.

18. A process according to claim 1 wherein the velocity in said second stage cyclonic combustor is about 30 to about 275 feet per second.

19. A process according to claim 1 wherein said excess stoichiometric oxygen conditions in said second stage cyclonic combustor are achieved by tangentially introducing oxygen containing gas to provide said oxygen in an amount about 5 to about 10 percent excess of the stoichiometric oxygen necessary for complete combustion in said cyclonic combustor.

20. A process according to claim 1 wherein molar ratios of metal in said sulfur fixation agent to said sulfur in said carbonaceous materials is about 1 to about 5.

21. A process according to claim 1 wherein said sulfur fixation agent particulates are sized to have about the same retention time in said fluidized bed as solids of said carbonaceous materials.

22. A process according to claim 1 wherein oxygen content of said withdrawal gas is
than about 5 volume percent greater than more oxygen content of said fluidizing gas.

23. A process according to claim 1 wherein thermal energy is withdrawn from said combustor by passage of a fluid through said bed support grid and through a jacket of the upper portion of said withdrawal conduit.

24. A process according to claim 1 wherein thermal energy is withdrawn from said combustor by passage of a fluid through at least one heat exchanger within said fluidized bed.

25. A process according to claim 1 wherein thermal energy is withdrawn from said combustor by passage of a fluid through at least one heat exchanger in the headspace above said fluidized bed.

26. A process for combusting sulfur and nitrogen containing carbonaceous materials in a two stage combustion process comprising:

introducing sulfur and nitrogen containing carbonaceous combustible materials selected from the group consisting of coal, oil shale, petroleum coke, peat, lignite, solid waste, refuse derived fuel, refiner and sewage plate sludges, liquid wastes, solid biomass materials, and mixtures thereof and sulfur fixation agent particulates selected from the group consisting of limestone, dolomite, siderite, iron oxide, zinc oxide, and mixtures thereof into a first combustion stage single fluidized bed supported upon and maintained fluidized by fluidizing gas introduced through a perforated sloping bed support grid within a single combustor having a density/size selective solids withdrawal conduit at a base portion of said bed with upflowing withdrawal gas, the superficial velocity in said fluidized bed is about 4 to about 15 feet per second;

combusting said carbonaceous materials in said fluidized bed under substoichiometric oxygen conditions wherein the total amount of said oxygen of said fluidizing gas and said withdrawal gas is about 40 to about 70 percent of the stoichiometric oxygen necessary for complete combustion of said carbonaceous materials in said fluidized bed and at temperatures of about 1600° to 2000° F. producing ash and reducing gases forming a reducing region in a major portion of said single fluidized bed, said reducing gases comprising gaseous sulfur compounds;

reacting said gaseous sulfur compounds with oxides of said sulfur fixation agent in said reducing region of said single fluidized bed to form an intermediate solid metallic sulfur compound;

converting said nitrogen contained in said carbonaceous materials into molecular nitrogen in said reducing region of said single fluidized bed;

reacting said intermediate solid metallic sulfur compound in an oxidizing region maintained at a base portion of said fluidized bed and the upper portion of said selective solids withdrawal conduit by said upflowing withdrawal gas to form a stable, solid, environmentally acceptable sulfur-containing compound;

agglomerating said ash in said oxidizing region to form easy transportable, non-leachable, environmentally acceptable ash;

withdrawing said agglomerated ash and said stable, solid, environmentally acceptable sulfur-containing compound from said single fluidized bed through said selective solids withdrawal conduit;

passing said reducing gases, fine particulates of uncombusted said carbonaceous material, fine particulates of said sulfur fixation agent from said fluidized bed and tangentially introducing said reducing gases and said particulates into a second combustion stage cyclonic combustor wherein the velocity is about 30 to about 275 feet per second;

burning said reducing gases and said uncombusted carbonaceous materials in said second stage cyclonic combustor under excess stoichiometric oxygen conditions achieved by tangentially introducing oxygen containing gas to provide said oxygen in an amount about 5 to about 10 percent excess of the stoichiometric oxygen necessary for complete combustion in said cyclonic combustor at temperatures of about 1800° to 2200° F.;

reacting said fine particulates of said sulfur fixation agent with sulfur oxides formed during said burning in said second stage cyclonic combustor to form a stable, solid, environmentally acceptable sulfur-containing compound;

separating solid fines separated in said second combustion stage cyclonic combustor and recycling said fines to said first combustion stage fluidized bed; and removing from said second stage combustor flue gases comprising environmentally acceptable amount of CO, $NO_x$, $SO_x$, and TCH content.

27. A process according to claim 26 wherein molar ratios of metal in said sulfur fixation agent to said sulfur in said carbonaceous combustible materials is about 1 to about 5.

28. A process according to claim 26 wherein said sulfur fixation agent particulates are sized to have about the same retention time in said fluidized bed as solids of said carbonaceous feed.

29. A process according to claim 26 wherein oxygen content of said withdrawal gas is more than about 5 volume percent greater than oxygen content of said fluidizing gas.

* * * * *

UNITED STATES PATENT AND TRADEMARK OFFICE
CERTIFICATE OF CORRECTION

PATENT NO. : 4,854,249

DATED : August 8, 1989

INVENTOR(S) : Mark J. Khinkis, Jitendra A. Patel and William A. Sandstrom

It is certified that error appears in the above—identified patent and that said Letters Patent is hereby corrected as shown below:

In the claims, Col. 12, line 33 after "is" insert --more--;

Col. 12, line 34 after "than" second occurrence, delete "more";

Col. 14, line 24 delete "TCH" and insert --THC--.

Signed and Sealed this

Twenty-ninth Day of May, 1990

Attest:

HARRY F. MANBECK, JR.

Attesting Officer

Commissioner of Patents and Trademarks